3,469,008
MEDICINAL COMPOSITIONS WHICH CONTAIN
15,16β-METHYLENE STEROIDS OF THE 19
NOR-ANDROSTANE SERIES
Otfried Schmidt, Rudolf Wiechert, and Friedmund Neumann, Berlin, Germany, assignors to A.G. Schering, Berlin, Germany
No Drawing. Filed Mar. 28, 1967, Ser. No. 626,427
Claims priority, application Germany, Apr. 2, 1966, Sch 38,778
Int. Cl. A61k 17/06; C07c 171/06
U.S. Cl. 424—243
10 Claims

ABSTRACT OF THE DISCLOSURE 15,16β-methylene steroids of the 19-nor-androstane series.

---

The invention relates to methods of preparing 15,16-β-methylene steroids of the formula

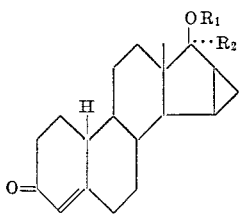

I wherein $R_1$ is hydrogen or acyl, $R_2$ is hydrogen or saturated or unsaturated lower alkyl, characterized in that compounds of the formula

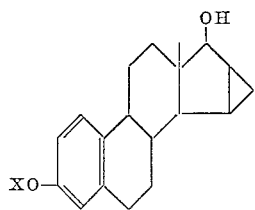

II wherein X is alkyl or tetrahydropyranyl, are reduced electrolytically or according to Birch's known method, and, if desired, the 15,16-β-methylene-19-nor-testosterone so formed is thereafter acylated or oxidized to the 17-ketone, if so desired, the 3-keto group being temporarily protect, as required, for example by ketalization, a saturated or unsaturated alkyl radical is introduced in position 17 of the 15,16-β-methylene-9-nor-Δ⁴-androstene-3,17-dione by Grignard's reaction or in a manner chemically equivalent thereto, and, if desired, a 17α-alkinyl group so introduced is subsequently hydrogenated to the corresponding alkenyl or alkanyl group, and the hydroxyl group in position 17 is esterfied, if so desired, with an ultimately desired acid or a reactive derivative of such an acid.

All acyl radicals are suitable which are derived from acids customarily employed for esterification in steroid chemistry. Preferred acids are those having up to 15 carbon atoms, but particularly lower and medium aliphatic carboxylic acids. The acids may also be unsaturated, branched, polybasic, or substituted in the usual manner, for example, by hydroxyl, amino groups, or halogen atoms. Cycloaliphatic, aromatic, araliphatic or heterocyclic acids are also suitable and may also be substituted in the usual manner. Preferred acids from which to derive the acyl radical $R_1$ include, for example: acetic acid, propionic acid, caproic acid, oenanthic acid, undecanoic acid, oleic acid, trimethylacetic acid, haloacetic acid, cyclopentylpropionic acid, phenylpropionic acid, phenylacetic acid, phenoxyacetic acid, dialkylaminoacetic acid, piperidinoacetic acid, succinic acid, benzoic acid, etc.; also the usual inorganic acids, such as sulfuric and phosphoric acid.

The esterification may be carried out according to known methods such as the reaction with acid anhydrides or acid halides in the presence of acidic or basic reagents or the reaction with the desired acid in the presence of trifluoroacetic anhydride are specifically contemplated.

Suitable methods for the hydrogenation of the aromatic A ring include the commonly known chemical reduction with lithium in liquid ammonia according to Birch and the electrolytic reduction in suitable organic solvents and in the presence of electrolyte salts.

Solvents for the electrolysis include the preferred primary, secondary, or tertiary alklyamines, also aliphatic amines having several amino groups. Methylamine, ethylamine, and ethylene diamine are particularly well suited. It is advantageous in some cases to add other, inert solvents, for example, ethers such as tetrahydrofuran, in order to increase the solubility of the steroids employed.

All salts which dissociate readily in the solvents or solvent mixtures employed may serve as electrolyte salts. The alkali metal and alkaline earth metal halides are particularly suitable.

The $\Delta^{2,5(10)}$-3-methyl ethers obtained by chemical or electrolytic reduction or hydrogenation are hydrolyzed by means of strong acids to the corresponding 19-nor-$\Delta^4$-3-ketosteroids.

The conversion of the 17α-hydrogen-17β-hydroxyl configuration into the 17α-alkyl-17β-hydroxyl configuration, if desired, can be carried out, for example, according to the teachings of German Patent No. 1,117,573, by first protecting the keto group in position 3, preferably by ketalization, thereafter oxidizing the hydroxy group in position 17, preferably by means of cyclohexanone in the presence of aluminum isopropylate, subjecting the 17-ketone so obtained to Grignard's reaction in a known manner, and subsequently removing the protective ketal group.

The ethinylation of the 17-ketone can be carried out to even greater advantage according to the method of the German Patent No. 1,096,354. According to this method, acetylene and an alkali metal are reacted with the 17-ketone in the presence of a tertiary alcohol at elevated pressure. A protection of the $\Delta^4$-unsaturated 3-keto group is not required in this reaction.

Suitable solvents include ether, such as diethyl ether, tetrahydrofuran, and dioxane. Among tertiary alcohols, tert-butyl alcohol and tert-amyl alcohol, for example, are suitable.

The new compounds produced by the method of the invention are distinguished by superior anabolic effects and simultaneously by a particularly favorable relationship of the desired anabolic effects and the undesired androgenic side effects, as shown by the following table in which properties of 15,16β-methylene-19-nor-$\Delta^4$-androstene-17β-ol-3-one-17-acetate (III) are compared with testosterone propionate (I), a known standard substance, and with the commercially available 1-methyl-$\Delta^1$-5α-androstene-17β-ol-3-one-17-acetate (II). The test results listed in the table were determined in castrated male rats after subcutaneous application in the usual anabolic-androgenic test, the dosage at which a levator ani weight of at least 50 mg. per 100 g. rat was achieved being determined for comparison purposes. As a measure of the androgenic effect, the associated seminal vesicle weight per 100 g. rat was entered.

TABLE

| Substance | Dosage, mg. | Lev. ani, mg. | Seminal vesicle, mg. |
| --- | --- | --- | --- |
| (I) Testosterone propionate | 1 | 56 | 529 |
| (II) 1-methyl-$\Delta^1$-5$\beta$-androstene-17$\beta$-ol-3-one-17-acetate. | 1 | 51 | 371 |
| (III) 15,16$\beta$-methylene-19-nor-$\Delta^4$-androstene-17$\beta$-ol-3-one-17-acetate. | 0.3 | 57 | 107 |

The esters having long carbon chains in the acid moiety moreover have a very valuable protracted effect. Aside from the afore-mentioned subcutaneous anabolic effect, the new products of the method herein also have strong anabolic effects when applied orally, and practically negligible androgenic side effects even at high dosage rates. For example, the 15,16$\beta$-methylene-19-nor-$\Delta^4$-androstene-17$\beta$-ol-3-one-17-acetate is twice as effective in the levator ani/seminal vesicle test as 17$\alpha$-methyltestosterone which is a commonly used comparison standard, yet it lacks the harmful side effects, particularly on the liver, usual in steroids alkylated in position 17. The strong anabolic effect after oral ingestion is most surprising because, according to the prevailing opinion of the experts in this field, the compounds having a secondary 17-hydroxy radical are expected to suffer a sharp decline in effectiveness in oral application because of oxidative degradation.

The novel compounds of the invention are intended as anabolic pharmaceuticals in combination with carriers known and usual in galenic pharmacy. Suitable compositions include oily solutions in vials for intramuscular injection. For oral application, tablets, capsules, pills, dragees, granulates, suspensions, solutions, and the like are being contemplated.

The pharmacological tests have been confirmed by clinical tests in the expected manner. Metabolism balance tests performed on humans have shown that, for example, 15,16$\beta$ - methylene - 19 - nor - $\Delta^4$ - androstene - 17$\beta$ - ol-3-one-17-acetate has a good anabolic effect after intramuscular injection of 5 to 10 mg. daily. Patients under treatment retained per day about 2–3 g. nitrogen more than in the period prior to treatment. During further tests on metabolism balance, it was found that the oenanthate is particularly long acting. The toxicity of the active agents of the invention is far outside the range of therapeutic doses to be considered for practical application. Side effects, and especially lack of tolerance, have not been observed.

The new active agents are applicable in all indications in which it is necessary to enhance the formation of proteins by anabolic agents. The following fields of application are mentioned by way of example: reconvalescence, poor general condition, debilitating diseases, cachectic conditions, lack of appetite, underweight, exhaustion, radiation therapy, anemia, extended corticoid therapy, osteoporosis, chronic kidney diseases, etc.

The following examples are illustrative but not restrictive of the invention.

EXAMPLE 1

7.5 g. 15,16$\beta$-methylene-$\Delta^{1,3,5(10)}$-estratriene-3,17$\beta$-diol-3-methyl ether (M.P. 108–111° C.); prepared from 15-dehydroestrone methyl ether with dimethymethylenesulfoniumoxide in dimethylsulfoxide at room temperature, and by reduction of the obtained 15,16$\beta$-methylene-estrone-methyl ether of M.P. 169–170.5° C. with lithium aluminum hydride dissolved in 500 ml. tetrahydrofuran are slowly added drop by drop with stirring to 750 ml. liquid ammonia, and 7.5 g. lithium chips are added thereafter. After 15 minutes, 125 ml. of ethanol are cautiously added drop by drop, and the ammonia is permitted to evaporate overnight. The crude 3-methoxy-2,5(10)-diene (7.9 g.) recovered by means of ether is dissolved in 375 ml. methanol and 75 ml. 3 N hydrochloric acid, and the solution is stirred 15 minutes at 60° C. The crude product is then precipitated by means of ice water, filtered off, dried, and recrystallized from diisopropyl ether. 4.07 g. 15,16$\beta$-methylene-19-nor-$\Delta^4$-androstene-17$\beta$-ol-3-one of melting point 163–164.5° C. are obtained.

EXAMPLE 2

Direct current of 2 amperes and 50 volts is passed for 30 hours between platinum electrodes 2 x 5 cm. spaced 12.5 cm. apart in a solution of 10 g. 15,16$\beta$-methylene-$\Delta^{1,3,5(10)}$-estratriene-3,17$\beta$-diol-3-methyl ether and 15 g. lithium chloride in 350 ml. methylamine, while the solution is being stirred and refluxed. 20 ml. methanol are thereafter added, the methylamine is distilled off, and a precipitate is formed by addition of water. The enol ether dissociation of the 15,16$\beta$-methylene-3-methoxy-$\Delta^{2,5(10)}$-estradiene-17$\beta$-ol so obtained is carried out as described in Example 1. There are obtained 5.6 g. 15,16$\beta$-methylene-19-nor-$\Delta^4$-androstene-17$\beta$-ol-3-one having a melting point of 163–165° C. (from isopropyl ether).

EXAMPLE 3

1 g. 15,16$\beta$-methylene-19-nor-$\Delta^4$-androstene-17$\beta$-ol-3-one is dissolved in 5 ml. dry pyridine and 2.5 ml. acetic anhydride, and the mixture is stirred overnight at room temperature. 1.1 g. of a crude product are recovered by precipitation with ice water, and are chromatographed on 60 g. silica gel. The homogeneous crystallizing fractions of the eluate are combined, recrystallized from hexane, and 800 mg. 15,16$\beta$-methylene-19-nor-$\Delta^4$-androstene-17$\beta$-ol-3-one-17-acetate of melting point 106–107° C. are obtained.

EXAMPLE 4

2.6 ml. of an 8 N chromic acid solution are added slowly dropwise with stirring to a solution of 3 g. 15,16$\beta$-methylene-19-nor-$\Delta^4$-androstene-17$\beta$-ol-3-one in 400 ml. acetone at 0°–10°. Stirring is continued for three minutes after the addition, and a precipitate is formed by means of ice water. The crude compound obtained (2.75 g.) is recrystallized from diisopropyl ether and methylene chloride. 1.93 g. 15,16$\beta$-methylene-19-nor-$\Delta^4$-androstene-3,17-dione of melting point 166.5–168° C. are obtained.

100 ml. absolute tetrahydrofuran, 1.1 g. potassium, and 13.2 g. tert-butanol are fed to a 0.5 liter rotary autoclave. The autoclave is closed, purged with nitrogen, and rotated overnight under a nitrogen gage pressure of 2 atmospheres. Acetylene is then introduced through a tube whose orifice is immersed in the liquid until the total pressure rises to 4.5 atmospheres gage, and rotation is continued for two hours. 1.6 g. 15,16$\beta$-methylene-19-nor-$\Delta^4$-androstene-3,17-dione dissolved in 50 ml. tetrahydrofuran are pumped into the autoclave, and the autoclave is rotated for two additional hours. The pressure is released, the contents of the autoclave are transferred to a suction flask containing about 50 ml. 4 N sulfuric acid, the liquid is separated by suction filtration from the precipitated potassium salt and the filtrate is evaporated to dryness. The residue is taken up in methylene chloride and washed with water until neutral. The crude product obtained after evaporation of the solvent is purified by chromatography. 1.5 g. 15,16$\beta$-methylene-17$\alpha$-ethinyl-19-nor-$\Delta^4$-androstene-17$\beta$-ol-3-one of melting point 136–138° C. are obtained after recrystallization from hexane and methylene chloride.

EXAMPLE 5

1.5 g. 15,16$\beta$-methylene-17$\alpha$-ethinyl-19-nor-$\Delta^4$-androstene-17$\beta$-ol-3-one are heated in 30 ml. pyridine and acetic anhydride (2:1) for eight hours at 100° C. (steam bath). A precipitate is formed by means of ice water, and the washed and dried crude product (1.54 g.) is recrystallized from diisopropyl ether. 1.37 g. 15,16$\beta$-methylene-17$\alpha$-ethinyl-19-nor-$\Delta^4$-androstene-17$\beta$-ol-3-one-17 - acetate of melting point 188.5–190° C. are obtained.

EXAMPLE 6

1 g. 15,16β-methylene-19-nor-Δ⁴-androstene-17β-ol-3-one is dissolved in 5 ml. pyridine and 2 ml. propionic anhydride, and the solution is stirred over night at room temperature. 1.19 g. of a crude product are precipitated by addition of ice water. After recrystallizing from ether-pentane, 770 mg. 15,16β-methylene-19-nor-Δ⁴-androstene-17β-ol-3-one-17-propionate of melting point 100–101.5° C. are obtained.

UV: $\epsilon_{239}=17,500$

EXAMPLE 7

1.5 g. 15,16β-methylene-19-nor-Δ⁴-androstene-17β-ol-3-one are dissolved in 6 ml. pyridine and 3 ml. oenanthic anhydride, and the solution is stirred over night at room temperature. 3.08 g. of a crude compound are precipitated by means of ice water and recrystallized from hexane. 1.47 g. 15,16β-methylene-19-nor-Δ⁴-androstene-17β-ol-3-one-17-oenanthate of melting point 97.5–98.5° C. are obtained.

UV: $\epsilon_{239}=17,400$

EXAMPLE 8

A solution of 1.5 ml. phenylpropionyl chloride in 5 ml. benzene is added drop by drop to a cooled solution of 2.5 g. 15,16β-methylene-19-nor-Δ⁴-androstene-17β-ol-3-one in 10 ml. benzene, and the mixture is stirred over night. It is taken up in ether, washed with dilute sulfuric acid, sodium bicarbonate solution, and water, and the crude product (3.7 g.) obtained as a residue after evaporation of the solvent is recrystallized from diisopropyl ether. 2.65 g. 15,16β-methylene-19-nor-Δ⁴-androstene-17β-ol-3-one-17-phenylpropionate of melting point 99–100° C. are obtained.

UV: $\epsilon_{239}=17,200$

EXAMPLE 9

2.5 g. 15,16β-methylene-19-nor-Δ⁴-androstene-17β-ol-3-one are reacted with 1.5 ml. dichloroacetyl chloride in the manner of Example 8. After purification of the crude compound by chromatography, there are obtained 1.75 g. 15,16β-methylene-19-nor-Δ⁴-androstene - 17β - ol-3-one-17-dichloroacetate of melting point 167.5–169° C.

UV: $\epsilon_{239}=17,400$

EXAMPLE 10

Oily solutions in vials for intramuscular injection.

(a) 1 ml.≙5 mg. active agent 0.5 g. 15,16β-methylene-19-nor-Δ⁴-androstene-17β-ol-3-one-17-acetate are dissolved in enough castor oil-benzyl benzoate (7:3) to make 100 ml., filled in vials of 1 ml. each, and sterilized in a known manner.

Benzyl alcohol may be used instead of benzyl benzoate.

(b) 1 ml.≙10 mg. active agent 1 g. 15,16β-methylene-19-nor-Δ⁴-androstene-17β-ol-3-one-17-propionate is dissolved in enough sesame oil-benzyl benzoate (7:3) to make 100 ml., filled into vials of 1 ml. each, and sterilized in a known manner.

(c) 1 ml.≙50 mg. active agent 5 g. 15,16β-methylene-19-nor-Δ⁴-androstene-17β-ol-3-one-17-oenanthate are dissolved in enough sesame oil to make 100 ml., filled into vials of 1 ml. each, and sterilized in a known manner.

EXAMPLE 11

Tablets of 5 mg. 15,16β-methylene-19-nor-Δ⁴-androstene-17β-ol-3-one-17-acetate.

Composition for one tablet

|  | Mg. |
|---|---|
| 15,16β-methylene-19-nor-Δ⁴-androstene-17β-ol-3-one-17-acetate (micronized) | 5.000 |
| Lactose (DAB 6) (DAB=German Dispensatory) | 36.000 |
| Corn starch (USP XVI) | 71.565 |
| Talcum (DAB 6) | 6.000 |
| Gelatin, white (DAB 6) | 1.400 |
| Methyl p-hydroxybenzoate (DAB 6, 3rd supplement) | 0.024 |
| Propyl p-hydroxybenzoate (DAB 6, 3rd supplement) | 0.011 |
|  | 120.000 |

Corn starch, lactose, talcum, and gelatin serve as fillers, methyl and propyl p-hydroxybenzoate as preservatives. The tablets are prepared on a tableting press in the usual manner. (Dia.: 7 mm. with diametrical notch, height 2.7–2.8 mm., hardness 3 kg., decomposition in water at 20° C.: 1 minute.)

What is claimed is:

1. Compounds of the general formula

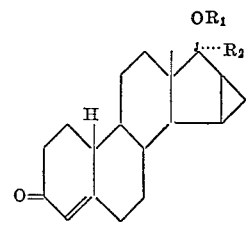

where $R_1$ is hydrogen or acyl, and $R_2$ is hydrogen, lower alkyl, alkenyl, and alkinyl.

2. 15,16β - methylene-19-nor-Δ⁴-androstene - 17β-ol-3-one.

3. 15,16β-methylene - 19 - nor-Δ⁴-androstene-17β-ol-3-one-17-acetate.

4. 15,16β-methylene - 17α - ethinyl-19-nor-Δ⁴-androstene-17β-ol-3-one.

5. 15,16β-methylene - 17α - ethinyl-19-nor-Δ⁴-androstene-17β-ol-3-one-17-acetate.

6. 15,16β-methylene - 19 - nor-Δ⁴-androstene-17β-ol-3-one-17-propionate.

7. 15,16β-methylene - 19 - nor-Δ⁴-androstene-17β-ol-3-one-17-oenanthate.

8. 15,16β-methylene - 19 - nor-Δ⁴-androstene-17β-ol-3-one-17-phenylpropionate.

9. 15,16β-methylene - 19 - nor-Δ⁴-androstene-17β-ol-3-one-17-dichloroacetate.

10. A medicinal composition having anabolic activity, comprising a compound as set forth in claim 3, and an admixed carrier therefor.

References Cited

UNITED STATES PATENTS 3,338,928   8/1967   Beard et al. _____ 260—397.4

OTHER REFERENCES

Djerassi, Steroid Reactions, Holden-Day Inc. (1963), pp. 273–274, relied upon.

ELBERT L. ROBERTS, Primary Examiner

U.S. Cl. X.R.

260—397.4, 397.5